G. M. WALKER.
SPARE WHEEL SUPPORT.
APPLICATION FILED SEPT. 29, 1916. RENEWED NOV. 22, 1917.
1,251,713.
Patented Jan. 1, 1918.
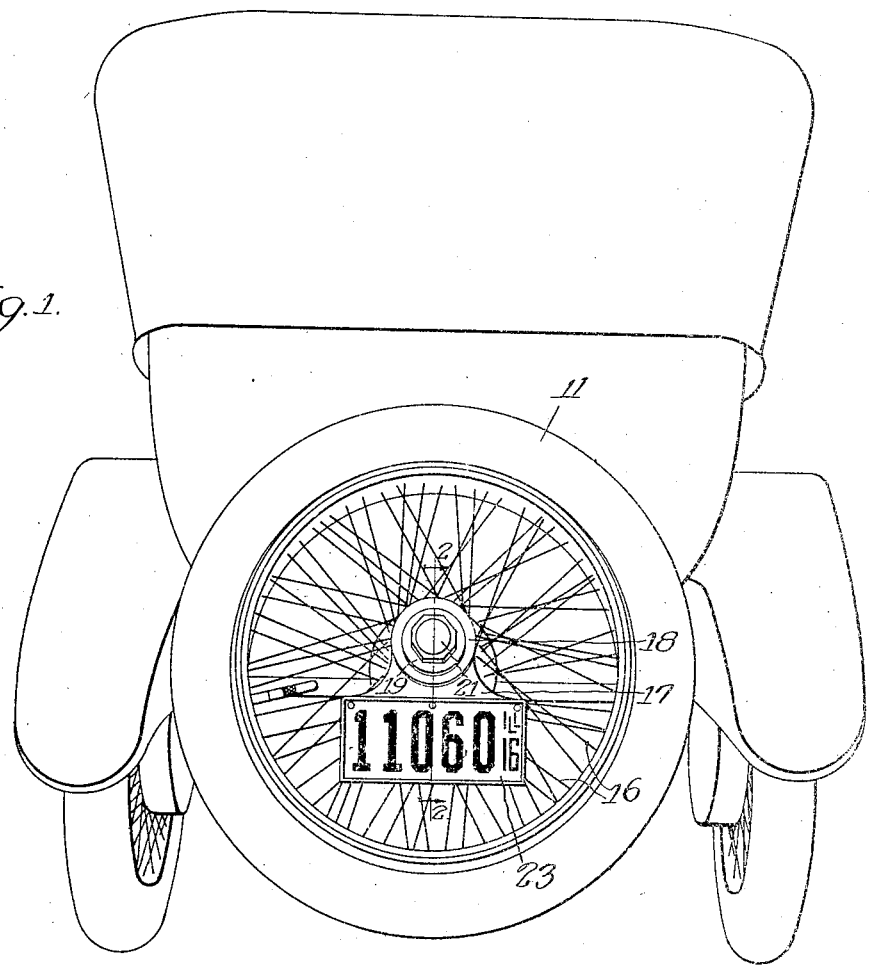
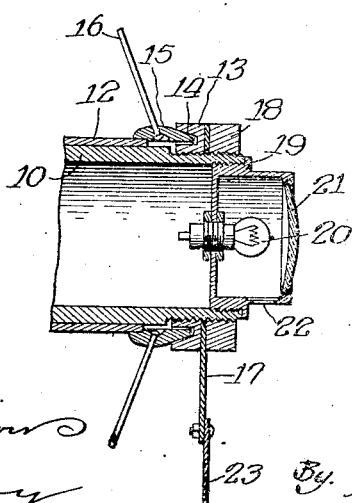

UNITED STATES PATENT OFFICE.

GEORGE M. WALKER, OF CHICAGO, ILLINOIS, ASSIGNOR OF ONE-HALF TO HERMANN A. BRASSERT, OF CHICAGO, ILLINOIS.

SPARE-WHEEL SUPPORT.

1,251,713.  Specification of Letters Patent.  Patented Jan. 1, 1918.

Application filed September 29, 1916, Serial No. 122,300. Renewed November 22, 1917. Serial No. 203,462.

*To all whom it may concern:*

Be it known that I, GEORGE M. WALKER, a citizen of the United States, and resident of Chicago, in the county of Cook and State of Illinois, have invented certain new and useful Improvements in Spare-Wheel Supports, of which the following is a specification.

My invention relates to automobiles and has particular reference to novel means which serve to provide for the mounting of the automobile spare wheel, the tail-light and the license bracket.

It is becoming more and more the general practice, particularly when wire wheels are used, to carry an entire spare wheel on the rear end of the car. The law requires the carrying of a tail-light and license number plate on the rear end of the car, with the plate illuminated. The general practice is to carry the number plate and tail-light on separate brackets, and very often an extra light is required to properly illuminate the number plate; since the law requires that the number plate must be visible from the side of the car at a certain angle, it is necessary to project the bracket well out from the car. This necessitates a long bracket, which is generally difficult to attach, liable to rattle in service and to be knocked off in collisions. The spare wheel is generally carried by a complicated bracket, which does not permit the wheel to be as easily exchanged as is desirable in case of tire trouble.

My invention contemplates the employment of a cylindrical projection or bracket secured centrally of the car at the rear thereof, this projection serving to support a spare wheel and, outside of the wheel, a license bracket. In the end of the cylindrical projection I mount an electric light and close the end of the cylinder with a red glass. A slit in the lower portion of the cylinder at the end thereof provides for the projection of a white light onto the license plate.

The invention will be more readily understood by reference to the accompanying drawings, wherein, Figure 1 is an end elevation of an automobile equipped with my invention, and Fig. 2 is a vertical section, somewhat enlarged, on the line 2—2 of Fig. 1.

Referring to the drawings, it will be seen that the automobile has secured to the rear end thereof a cylindrical projection or hub 10. This forms a permanent part of the car and is commonly arranged at an angle to the horizontal in order to economize space and to insure that the weight of the wheel will not ordinarily be exerted against the fastening devices which serve to retain the wheel in place. As shown, the wheel 11 is provided with a sleeve or cylindrical axial portion 12, which in practice fits over the permanent vehicle hub. The spare wheel 11 is held in place on the cylindrical projection 10 by means of a nut 13, having a groove 14 in one face thereof. This groove coöperates with the ring 15, within which the wheel spokes 16 are mounted.

A license bracket 17, is so constructed as to provide an opening of a size sufficient to permit its being slipped on over the cylinder 10 and abutted against the outer face of the nut 13. A clamping nut 18 is then applied to the threaded outer end of the cylindrical projection 10 to hold the bracket in place.

In the hollow outer end of the cylindrical projection 10, I mount a lamp casing 19, having an electric light 20 therein. A red light 21 closes the end of the lamp casing, while a slit 22, provided in the casing at its lower side, permits of the projection of a white light onto the license plate 23, which is secured to the bracket 17. It will be noted that the lamp casing is of a diameter less than the outer end of the cylinder 10, and therefore that the clamping nut, the license bracket and the spare wheel may be removed without interfering with the light.

In practice, the parts will be assembled as shown. A spare wheel is a part of the equipment of all automobiles which provide for the replacement of the wheel as a whole in order to effect tire changes. Therefore, there will at all times be a spare wheel at the rear of the machine. Assuming the necessity for a tire change, the nuts 18 and 13 and the license bracket 17 are removed, whereupon the spare wheel may be slipped off of the cylindrical projection 10. The spare wheel is then applied to the car and the damaged tire is placed on the projection 10 and the parts reassembled as shown. In none of the operations has the red light been interfered with.

I claim:

1. A spare wheel support for vehicles comprising a stub shaft for connection at one end with a vehicle the exterior of said stub shaft being of a shape and dimensions to receive the hub of a spare wheel, and means carried by the other end of the stub shaft for engagement with one end of the hub of a spare wheel to hold the latter in place on the stub shaft, said means including a nut embracing and threaded upon said other end of the stub shaft, and a tail lamp carried by said other end of the stub shaft, the external transverse dimensions of the tail lamp being less than the bore of the nut whereby the latter and the spare wheel may be applied to and removed from the stub shaft without requiring removal of the tail lamp.

2. A spare wheel support for vehicles comprising a stub shaft for connection at one end with a vehicle, the exterior of said stub shaft being of a shape and dimensions to receive the hub of a spare wheel, means carried by the other end of the stub shaft to hold a spare wheel in place on the stub shaft, said other end of the stub shaft having a socket therein, and a tail lamp within said socket whereby the spare wheel may be applied and removed without disturbing the lamp.

3. A spare wheel support for vehicles comprising a stub shaft for connection at one end with a vehicle, the exterior of said stub shaft being of a shape and dimensions to receive the hub of a spare wheel, means carried by the other end of the stub shaft holding a spare wheel in place on the stub shaft, and means for securing a license on said other end of the stub shaft.

4. A spare wheel support for vehicles comprising a stub shaft for connection at one end with a vehicle, the exterior of said stub shaft being of a shape and dimensions to receive the hub of a spare wheel, means carried by the other end of the stub shaft to hold the spare wheel in place on the stub shaft, means for securing a license bracket on said other end of the stub shaft outside of the means for holding the spare wheel in place, and a tail lamp carried by said other end of the stub shaft, said tail lamp and said license bracket securing means being disposed for illumination of a license by the tail lamp.

5. A spare wheel support for vehicles comprising a tubular cylindrical stub shaft for connection at one end with a vehicle, the exterior of said stub shaft being of a shape and dimensions to receive the hub of a spare wheel with its other end projecting externally of the hub, said end portion of the stub shaft being exteriorly threaded, a pair of nuts on said threaded portion of the stub shaft, the inner nut constituting an adjustable abutment for engagement with the adjacent end of the hub of a spare wheel, a license bracket embracing the threaded portion of the stub shaft and held between the nuts, and a tail lamp fitted within said other end of the stub shaft and having its transverse dimensions less than the bore of each nut, and said tail lamp having a lateral opening for illuminating a license carried by the license bracket.

6. In a device of the class described, the combination of a spare wheel support in the form of a tubular projection from a vehicle, the interior of the projection being arranged to accommodate a lamp, the free end of the projection being shaped to receive a license bracket, and a manually operable holding device for retaining said wheel and bracket in place.

7. A spare wheel support for vehicles comprising a stub shaft for connection at one end with a vehicle, said stub shaft having an external seat of a shape and dimensions to receive the hub of a spare wheel, a tail lamp carried by the outer end of the stub shaft and having a location and dimensions to permit of the application and removal of a spare wheel across and around the lamp, and means carried by the stub shaft for holding a spare wheel thereon.

Signed at Chicago, Illinois, this 26th day of September, 1916.

GEORGE M. WALKER.

Witnesses:
D. V. MEDALIE,
L. L. DRUMHELLER.